US011467274B2

(12) United States Patent
Sequeira et al.

(10) Patent No.: US 11,467,274 B2
(45) Date of Patent: Oct. 11, 2022

(54) SEARCH AND RESCUE UAV SYSTEM AND METHOD

(71) Applicant: Tyco Fire & Security GmbH, Neuhausen am Rheinfall (CH)

(72) Inventors: Melwyn F. Sequeira, Plantation, FL (US); Mohammad Mohiuddin, Boynton Beach, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 209 days.

(21) Appl. No.: 14/869,531

(22) Filed: Sep. 29, 2015

(65) Prior Publication Data
US 2017/0088261 A1 Mar. 30, 2017

(51) Int. Cl.
| | |
|---|---|
| *G01S 13/02* | (2006.01) |
| *G01S 13/88* | (2006.01) |
| *G08G 5/00* | (2006.01) |
| *G05D 1/10* | (2006.01) |
| *G01S 13/90* | (2006.01) |

(52) U.S. Cl.
CPC ........ *G01S 13/0209* (2013.01); *G01S 13/888* (2013.01); *G05D 1/104* (2013.01); *G08G 5/00* (2013.01); *B64C 2201/12* (2013.01); *G01S 13/90* (2013.01); *G01S 2013/0245* (2013.01)

(58) Field of Classification Search
CPC ............ B64C 39/024; B64C 2201/126; B64C 2201/127; B64C 2201/146; G01S 13/90; G01S 13/888; G01S 13/0209; G01S 2013/0245; G05D 1/0038; G05D 1/0044; G08G 5/0073; G08G 5/0069; G06K 9/00624; G06T 7/00
See application file for complete search history.

(56) References Cited

U.S. PATENT DOCUMENTS

| | | | | |
|---|---|---|---|---|
| 5,532,702 A | * | 7/1996 | Mintz | G08G 1/127 342/463 |
| 6,056,237 A | * | 5/2000 | Woodland | B64C 3/40 244/120 |
| 8,130,141 B2 | * | 3/2012 | Pattabiraman | G01S 19/11 342/357.29 |
| 8,322,648 B2 | | 12/2012 | Kroetsch et al. | |
| 8,521,339 B2 | | 8/2013 | Gariepy et al. | |

(Continued)

FOREIGN PATENT DOCUMENTS

EP 2 571 264 A1 3/2013

OTHER PUBLICATIONS

Singh et al., "Sense through wall human detection using UWB radar," EURASIP Journal on Wireless Communications and Networking, 2011, 2011: 20. http://jwcn.eurasipjournals.com/content/2011/1/20.

(Continued)

*Primary Examiner* — Peter D Nolan
*Assistant Examiner* — Michael F Whalen
(74) *Attorney, Agent, or Firm* — ArentFox Schiff LLP

(57) ABSTRACT

An unmanned aerial vehicle (UAV) having at least one sensor for detecting the presence of a survivor in a search and rescue area. The at least one sensor is preferably an ultra-wide band (UWB) transceiver sensor. The UAV includes a UAV data link transceiver for wirelessly communicating information concerning the survivor to a command center.

9 Claims, 5 Drawing Sheets

(56) References Cited

U.S. PATENT DOCUMENTS

| | | | | |
|---|---|---|---|---|
| 8,643,719 B2* | 2/2014 | Vian | ................ | G08G 5/0039 |
| | | | | 348/144 |
| 8,744,760 B1* | 6/2014 | Mishmash | ........... | G01C 23/005 |
| | | | | 701/454 |
| 8,989,922 B2 | 3/2015 | Jones et al. | | |
| 9,057,606 B2* | 6/2015 | Wolf | ....................... | G01S 5/021 |
| 9,745,062 B2 | 8/2017 | Richardson | | |
| 9,888,337 B1* | 2/2018 | Zalewski | .............. | H04W 76/14 |
| 9,944,366 B2* | 4/2018 | Tang | ........................ | B63C 9/01 |
| 10,617,330 B1 | 4/2020 | Joshi et al. | | |
| 10,670,706 B2 | 6/2020 | Schwager et al. | | |
| 10,743,100 B1 | 8/2020 | Eckert et al. | | |
| 2006/0012474 A1* | 1/2006 | Lu | ....................... | G01S 13/0209 |
| | | | | 340/539.13 |
| 2006/0170584 A1 | 8/2006 | Romero et al. | | |
| 2008/0027591 A1* | 1/2008 | Lenser | ................. | G05D 1/0251 |
| | | | | 701/2 |
| 2008/0136626 A1* | 6/2008 | Hudson | ................ | G01S 17/023 |
| | | | | 340/540 |
| 2008/0220732 A1 | 9/2008 | Ikramov et al. | | |
| 2009/0327273 A1* | 12/2009 | Aung | ..................... | G01C 23/00 |
| 2011/0193739 A1 | 8/2011 | Strauch et al. | | |
| 2012/0112880 A1* | 5/2012 | Meyers | ................... | H04W 4/90 |
| | | | | 340/5.54 |
| 2012/0116931 A1* | 5/2012 | Meyers | ................... | G06Q 10/06 |
| | | | | 705/28 |
| 2014/0111332 A1 | 4/2014 | Przybylko et al. | | |
| 2014/0172310 A1 | 6/2014 | Chin et al. | | |
| 2014/0222246 A1* | 8/2014 | Mohamadi | ........... | G01S 13/913 |
| | | | | 701/2 |
| 2015/0066248 A1* | 3/2015 | Arbeit | .................... | G01C 21/20 |
| | | | | 701/2 |
| 2015/0077282 A1* | 3/2015 | Mohamadi | .............. | G01S 7/415 |
| | | | | 342/27 |
| 2015/0099537 A1* | 4/2015 | Merithew | ............. | H04W 4/021 |
| | | | | 455/456.1 |
| 2015/0142211 A1 | 5/2015 | Shehata et al. | | |
| 2015/0205298 A1* | 7/2015 | Stoschek | ............... | B60W 40/02 |
| | | | | 701/23 |
| 2015/0237834 A1 | 8/2015 | Schab et al. | | |
| 2015/0266576 A1 | 9/2015 | Hobbart et al. | | |
| 2016/0027292 A1 | 1/2016 | Kerning | | |
| 2016/0043771 A1 | 2/2016 | Mohamad | | |
| 2016/0089052 A1 | 3/2016 | Cho et al. | | |
| 2016/0165562 A1* | 6/2016 | Raghupathy | ........ | H04W 56/001 |
| | | | | 370/350 |
| 2016/0170411 A1* | 6/2016 | Wei | ...................... | G05D 1/0214 |
| | | | | 701/25 |
| 2016/0171303 A1* | 6/2016 | Moore | ..................... | G06T 7/70 |
| | | | | 382/153 |
| 2016/0247405 A1 | 8/2016 | Paczan et al. | | |
| 2016/0247407 A1 | 8/2016 | Paczan et al. | | |
| 2016/0285611 A1 | 9/2016 | Fischer et al. | | |
| 2016/0340006 A1* | 11/2016 | Tang | ........................ | B63C 9/01 |
| 2016/0364891 A1* | 12/2016 | Hayes | ..................... | G06T 11/60 |
| 2017/0053169 A1* | 2/2017 | Cuban | .................... | H04N 7/185 |
| 2017/0092109 A1* | 3/2017 | Trundle | ................. | G05D 1/104 |
| 2017/0127606 A1* | 5/2017 | Horton | ..................... | A01C 5/06 |
| 2017/0195904 A1 | 7/2017 | Jablonski | | |
| 2017/0210451 A1* | 7/2017 | Oh | .......................... | B63C 9/01 |
| 2017/0230925 A1* | 8/2017 | Meiyappan | ......... | H04W 56/001 |
| 2017/0253330 A1* | 9/2017 | Saigh | .................... | B64C 39/024 |
| 2017/0350959 A1 | 12/2017 | Yaqub et al. | | |
| 2018/0027772 A1 | 2/2018 | Gordon et al. | | |
| 2018/0074161 A1 | 3/2018 | Rosenbaum et al. | | |
| 2018/0091875 A1 | 3/2018 | Bryson et al. | | |
| 2018/0170414 A1* | 6/2018 | Arndt | .................. | B61L 27/0094 |
| 2018/0263220 A1 | 9/2018 | Schab et al. | | |
| 2019/0057777 A1 | 2/2019 | Joshi et al. | | |
| 2019/0088103 A1 | 3/2019 | Lebron et al. | | |
| 2019/0170845 A1* | 6/2019 | Stroiescu | ................ | G01S 1/024 |
| 2019/0297462 A1 | 9/2019 | Aljadeff | | |
| 2019/0363746 A1* | 11/2019 | Zalewski | ................ | H04L 67/10 |
| 2019/0374126 A1 | 12/2019 | Cho et al. | | |
| 2019/0377346 A1* | 12/2019 | Freitas | .................. | B62D 55/04 |
| 2020/0031437 A1 | 1/2020 | Moses et al. | | |
| 2020/0135005 A1* | 4/2020 | Katz | ....................... | G06F 9/542 |
| 2020/0158819 A1 | 5/2020 | Joshi et al. | | |
| 2020/0158849 A1 | 5/2020 | Joshi et al. | | |
| 2020/0256972 A1 | 8/2020 | Eckert et al. | | |
| 2020/0265698 A1 | 8/2020 | Eckert et al. | | |
| 2020/0300579 A1* | 9/2020 | Baumgartner | ............ | F41G 3/08 |
| 2020/0369384 A1* | 11/2020 | Kelly | ..................... | G05D 1/106 |
| 2020/0398985 A1* | 12/2020 | Hsu | .................. | G08G 1/096811 |
| 2021/0096216 A1 | 4/2021 | Rigazio et al. | | |
| 2021/0146977 A1* | 5/2021 | Rajan Kesavelu Shekar | ............. | |
| | | | | B61K 9/08 |

OTHER PUBLICATIONS

Ralston et al., "Real-time Through-wall Imaging Using an Ultrawideband Multiple-Input Multiple-Output (MIMO) Phased Array Radar System," IEEE, 2010, 551-558.

Hamer et al., "Knowledge Transfer for High-Performance Quadrocopter Maneuvers," IEEE/RSJ International Conference on Intelligent Robots and Systems. IEEE, 2013, 1714-1719.

Hehn et al., "A Frequency Domain Iterative Feed-Forward Learning Scheme for High Performance Periodic Quadrocopter Maneuvers," IEEE/RSJ International Conference on Intelligent Robots and Systems. IEEE, 2013.

* cited by examiner

SEARCH AND RESCUE UAV SYSTEM AND METHOD

BACKGROUND OF THE INVENTION

Fires, storms, earthquakes, terrorist attacks, and the like can create disaster situations that require search and rescue operations and even recovery operations. For example, survivors can become trapped and buried within debris and rubble as a result of these disaster situations. Additionally, search and rescue operations are also required when individuals become lost or are otherwise unable to return. First responders organize search and rescue operations to locate the trapped or lost survivors. Often, first responders must travel through harmful conditions to find and then help the survivors.

Unmanned aerial vehicles (UAVs) or drones represent an evolving technology that is becoming more ubiquitous. Currently, UAVs are used for such disparate applications as toys and weapons platforms. They are even being proposed for search and rescue applications. For example, thermal imaging kits are available to augment the imaging capabilities of standard consumer/hobbyist grade UAVs for search and rescue.

SUMMARY OF THE INVENTION

The present invention is directed toward solutions to accelerate search efforts while reducing the risks to the first responders and survivors. Specifically, the present invention system includes UAVs, or other type of unmanned vehicles, having sensors for detecting the presence of survivors in a search and rescue area. For example, these sensors allow UAVs to locate survivors buried in debris of an infrastructure damaged by earthquakes, storms, fires, etc. The UAVs of the present invention can also include UAV data link transceivers for wirelessly communicating information concerning the survivors to command centers. For example, these UAV data link transceivers allow UAVs to wirelessly communicate survivor vital signs telemetry data to mobile command centers (e.g., fire trucks). In general, the present system provides a solution that speeds up search and rescue operations to survivors while reducing or mitigating danger to first responders and survivors.

In general, according to one aspect, the invention features an unmanned aerial vehicle (UAV), including: an ultra-wide band (UWB) transceiver sensor for detecting a presence of a survivor in a search and rescue area and a UAV data link transceiver for wirelessly communicating information concerning the survivor to a command center.

The information concerning the survivor can include survivor vital signs telemetry data. For example, the survivor vital signs telemetry data include the heart and/or respiration rate of the survivor. In embodiments, the UAV data link transceiver is configured to wirelessly communicate the information concerning the survivor via a UAV-command data link to the command center.

Preferably, the UAV further includes an inter-UAV data link transceiver for wirelessly communicating information concerning the survivor to another UAV.

Preferably, the UAV further includes a medical supply compartment for holding emergency medical supplies. The medical supply compartment is configured to release medical supplies to the survivor based on the detected presence of the survivor.

The UAV can also include a UAV local positioning system module for determining the position of the UAV within the area. In examples, the module can receive or generate local positioning signals from multiple local positioning system portable antennas surrounding the search and rescue area for determining a position of the UAV in the search and rescue area.

The UAV can further include a proximity sensor for detecting the presence of objects in the search and rescue area. A gas sensor can also be included for detecting the presence of different kinds of gases, along with a visible light camera for detecting video.

In general, according to another aspect, a search and rescue system includes a command center and an unmanned aerial vehicle (UAV). The UAV has at least one sensor for detecting the presence of a survivor in the search and rescue area, and a UAV data link transceiver for wirelessly communicating information concerning the survivor to the command center.

The at least one sensor is preferably an ultra-wide band (UWB) transceiver sensor.

Preferably, the command center includes a 3-dimensional mapping system for creating a 3-dimensional contour map of the search and rescue area.

Preferably, the system further includes a wide-area modem for communicating over a cellular network.

In general, according to another aspect, the search and rescue method includes deploying an unmanned aerial vehicle (UAV) having an ultra-wide band (UWB) transceiver sensor in a search and rescue area. The UWB transceiver sensor detects the presence of a survivor in the search and rescue area and the UAV wirelessly communicates information concerning the survivor to a command center.

Preferably, the method further includes determining an ingress/egress path to the survivor. The command center can identify a hazardous condition in the determined ingress/egress path.

Preferably, the method further includes the UAV requesting deployment of a substitute UAV if the UAV is damaged or trapped.

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including a component or subsystem, is referred to and/or shown as being connected or coupled to another element, it can be directly connected or coupled to the other element or intervening elements may be present.

Figure 1A:
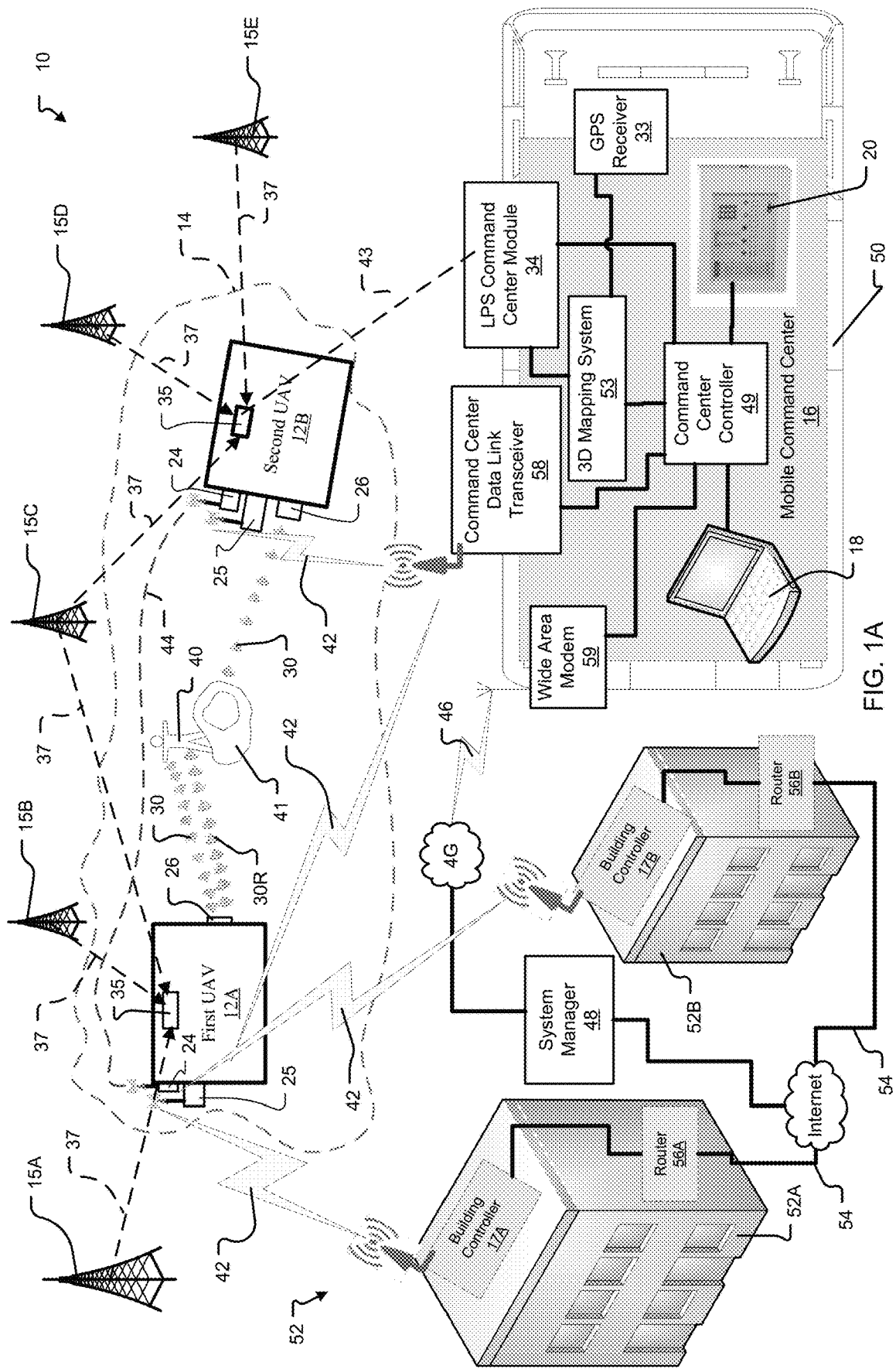
FIG. 1A is a schematic diagram of a search and rescue system according to the present invention.

FIG. 1A depicts a search and rescue system 10, according to one embodiment of the present invention.

The search and rescue system 10 includes unmanned aerial vehicles (UAVs) 12. As illustrated, the UAVs 12 are deployed to search for survivors 40 in a search and rescue area 14. In this example, a first UAV 12A and a second UAV 12B are deployed. Other examples can include deployment of one UAV 12, three UAVs 12, four UAVs 12, or any other number of UAVs 12 as appreciated by one of skill in the art.

The UAVs 12 have sensors such as ultra-wide band (UWB) transceiver sensors 26 for detecting survivors 40 in the search and rescue area 14. In one example, the UWB transceiver sensors 26 include radar technology such as UWB S-band multiple-input multiple-output (MIMO) phased array radar systems. In this example, the UWB transceiver sensors 26 include UWB impulse transmitters that transmit UWB radio signals 30 in multiple directions. The UWB radio signals 30 reflect off of objects and survivors 40 as reflected UWB radio signals 30R. The UWB transceiver sensors 26 include receivers for detecting and accepting the reflected UWB radio signals 30R. The UWB transceiver sensors 26 detect survivor vital signs telemetry data as movement or phase shifts in the reflected UWB radio signals 30R. For example, this detected movement of a survivor 40 can include walking and displacement of chest due to respiration rate or heart rate. The respiration rate or heart rate displacements can cause changes in frequency values, phase values, amplitude values, and arrival time values of the reflected UWB radio signals 30R compared to the transmitted UWB radio signals 30. The UWB transceiver sensors 26 use these value changes to detect a presence of survivors 40 as well as the vital signs telemetry data (heart rates and/or respiration rates) of survivors 40. Further, the UWB transceiver sensors 26 can determine a distance between the UAVs 12 and survivors 40 based on the time difference between transmission of the UWB radio signals 30 and receipt of the reflected UWB radio signals 30R from survivors 40. This distance can be used in determining the survivor's location.

UWB transceiver sensors 26 are capable of detecting survivors through debris 41 (e.g., a concrete wall). The UWB transceiver sensors 26 can generate UWB radio signals 30 in a large spectral range at low frequencies which enables the UWB radio signals 30 to penetrate through concrete walls or other debris 41. For example, the UWB transceiver sensors 26 can detect survivors 40 through a 10 cm thick concrete wall by using high-speed synthetic-aperture radar (SAR) imaging architecture. The UAVs 12 can use this technology to search for survivors 40 through debris 41.

UAVs 12 include UAV local positioning system (LPS) modules 35 that provide self positioning. UAVs 12 use the UAV LPS modules 35 to determine their UAV locations in the search and rescue area 14. In one example, the UAV LPS modules 35 receive local position LP signals 37 from multiple LPS portable antennas 15A-15C surrounding the search and rescue area 14. For example, the UAV LPS module 35 determines a UAV location for the UAV 12 by triangulating the UAV location based on received LP signals 37. In particular, the UAV LPS module 35 calculates the time difference between transmission and receipt of an LP signal 37. This time difference is a relative time delay for the particular LPS portable antenna (e.g., first LPS portable antenna 15A). The UAV LPS module 35 uses this time difference to determine the distance between the UAV 12 and the first LPS portable antenna 15A. This distance determination is repeated for the second and third LPS portable antennas 15B-15C based on their respective time delays. In this example, the UAV LPS module 35 triangulates its UAV location based on these determined distances between the UAV 12 and each of the LPS portable antennas 15A-15C. Alternatively, the UAV LPS module 35 can determine the UAV location by transmitting signals which are triangulated from the antennas. The UAV 12 can determine the survivor location based on the UAV location and distance and angle between the UAV 12 and survivor 40.

The UAVs 12 wirelessly communicate information concerning the survivor 40 to other UAVs 12 via inter-UAV data links 44. Each UAV 12 includes an inter-UAV data link transceiver 24 that enables communication via the inter-UAV data links 44. The inter-UAV data links 44 can be IEEE 802.11. The UAVs 12 use the inter-UAV data link transceivers 24 to continuously communicate with one another during search and rescue operations. For example, this inter-UAV communication eliminates potential overlap searching by a second UAV 12B as well as provides a way for other UAVs 12 to confirm accuracy of survivor detection by a first UAV 12A.

The UAVs 12 wirelessly communicate information concerning the survivor 40 (e.g., survivor location) to a mobile command center 16 via a UAV-command data link 42. Each UAV 12 includes a UAV data link transceiver 25 that enables communication with the mobile command center 16. The UAV-command data link 42 can be a sub-gigahertz data link such as a radio frequency (RF) sub-gigahertz data link, Z-wave data link, Zigbee data link, or other sub-gigahertz data link. The mobile command center 16 monitors and controls the UAVs 12 by receiving and sending data via the UAV-command data link 42.

In one example, the mobile command center 16 is located on a first responder vehicle 50 (e.g., onsite fire truck) and communicates remotely from this location. The mobile command center can be located at other remote locations as appreciated by one of skill in the art.

In the illustrated example, the mobile command center 16 includes a number of components used in monitoring and controlling the UAVs 12. The mobile command center 16 has a mobile command center controller 49 for directing and monitoring these components.

The mobile command center 16 has a command data link transceiver 58. The command data link transceiver 58 provides an access point for receiving and sending information and data to and from the UAVs 12.

The mobile command center 16 has a configurator computer workstation 18. The configurator computer workstation 18 includes a user interface for inputting commands to direct the mobile command center 16 and/or UAVs 12.

The mobile command center 16 has a mobile command center control panel 20. The mobile command center panel 20 can be used as an additional or alternative user interface for directing the mobile command center 16 and/or UAVs 12. In one example, the mobile command center panel 20 is in wireless communication with a campus alarm system via the campus network 54. The mobile command center panel 20 can receive alarm information for the different buildings 52A, 52B in the campus 52 from this campus alarm system (i.e., monitor campus alarm system). Further, the mobile command center panel 20 can be used to control alarm devices on the campus alarm system.

The system 10 can determine the UAV location using indirect remote positioning technology. As described above, the UAV LPS module 35 of the second UAV 12B receives LP signals 37 from portable antennas 15C-15E. The UAV LPS module 35 of the second UAV 12B can determine the signal distance for each portable antenna 15C, 15D, 15E as described above based on time delays. Then, the UAV LPS module 35 sends these signal distances as positioning signals 43 to the LPS command center module 34 of the mobile command center 16. Alternatively, the UAV LPS module 35 forwards the measured time delays for each portable antenna 15C, 15D, 15E as positioning signals 43. The LPS command center module 34 positions the second UAV location based on the received positioning signals 43 (signal distances or measure time delays). In particular, the LPS command center module 34 triangulates the UAV position of the second UAV 12B in the search and rescue area 14 based on the signal distances for the portable antennas 15C-15E. Alternatively, the LPS command center module 34 can determine the UAV location by trilateration or multilateration.

In another example, the UAV location can be determined using remote positioning technology. In this example, the UAV LPS module 35 is a transmitter that sends LP signals 37. The portable antennas 15A-15C are receivers for accepting the LP signals 37. Each receiver determines its distance from the UAV 12 based on the time delay for the LP signal 37 received as described above. The multiple receivers send these determined signal distances to a central site such as the mobile command center 16 for processing. The mobile command center 16 triangulates, trilaterates, or multilaterates the UAV position based on these determined signal distances.

In another example, the UAVs can be remotely controlled by a user using feedback control. In this example, the UAV 12 positions itself based on trajectory tracking In particular, the UAV 12 is configured to track the trajectory movement of a feedback controller and follow this movement in real-time. Thus, this type of local positioning technology relies on a feedback loop to position the UAV 12 continuously.

Other local positioning technologies such as indirect self-positioning can be used as appreciated by one of skill in the art.

The mobile command center 16 includes a global positioning system (GPS) receiver 33. The GPS receiver 33 can calculate the mobile command center location (e.g., GPS coordinates) by receiving GPS information from GPS satellites. In particular, the GPS receiver 33 uses the GPS information to determine its distance to each satellite based on time delay between transmission and receipt of the GPS information. The GPS receiver uses these distances to deduce its own location by using trilateration.

The mobile command center 16 includes a 3-dimensional site mapping system 53 for generating a map of the search and rescue area 14. The 3-dimensional site mapping system 53 receives the mobile command center location from the GPS receiver 33 and/or the UAV location from the LPS command center module 34. The 3-dimensional site mapping system 53 generates a 3-dimensional contour map of the region relative to the mobile command center location. The 3-dimensional site mapping system 53 can generate a 3-dimensional contour map of the region relative to the UAV location. Also, the 3-dimensional site mapping system 53 can generate a 3-dimensional contour map that marks the UAV location relative to the mobile command center location as well as the survivor location. The 3-dimensional site mapping system 53 can generate an ingress/egress path from the mobile command center 16 to the survivor.

The mobile command center 16 communicates with building controllers 17A, 17B via a system manager 48 in embodiments. The mobile command center 16 uses a wide area modem 59 to communicate information remotely to the system manager 48 via a wide area data link 46 (e.g., over a cellular network such as 4G LTE). The system manager 48 is a router and server combination. The building controllers 17A, 17B access information on the system manager 48 via campus routers 56A, 56B (i.e., Internet connection). For example, the campus routers 56A, 56B connect to the Internet via a campus network 54.

The building controller 17 may be located within a building 52A, 52B at a campus 52. In the illustrated example, a first building controller 17A is in building one 52A and a second building controller 17B is in building two 52B. The building controllers 17A, 17B access the campus network 54 via respective campus routers 56A, 56B.

Figure 1B:
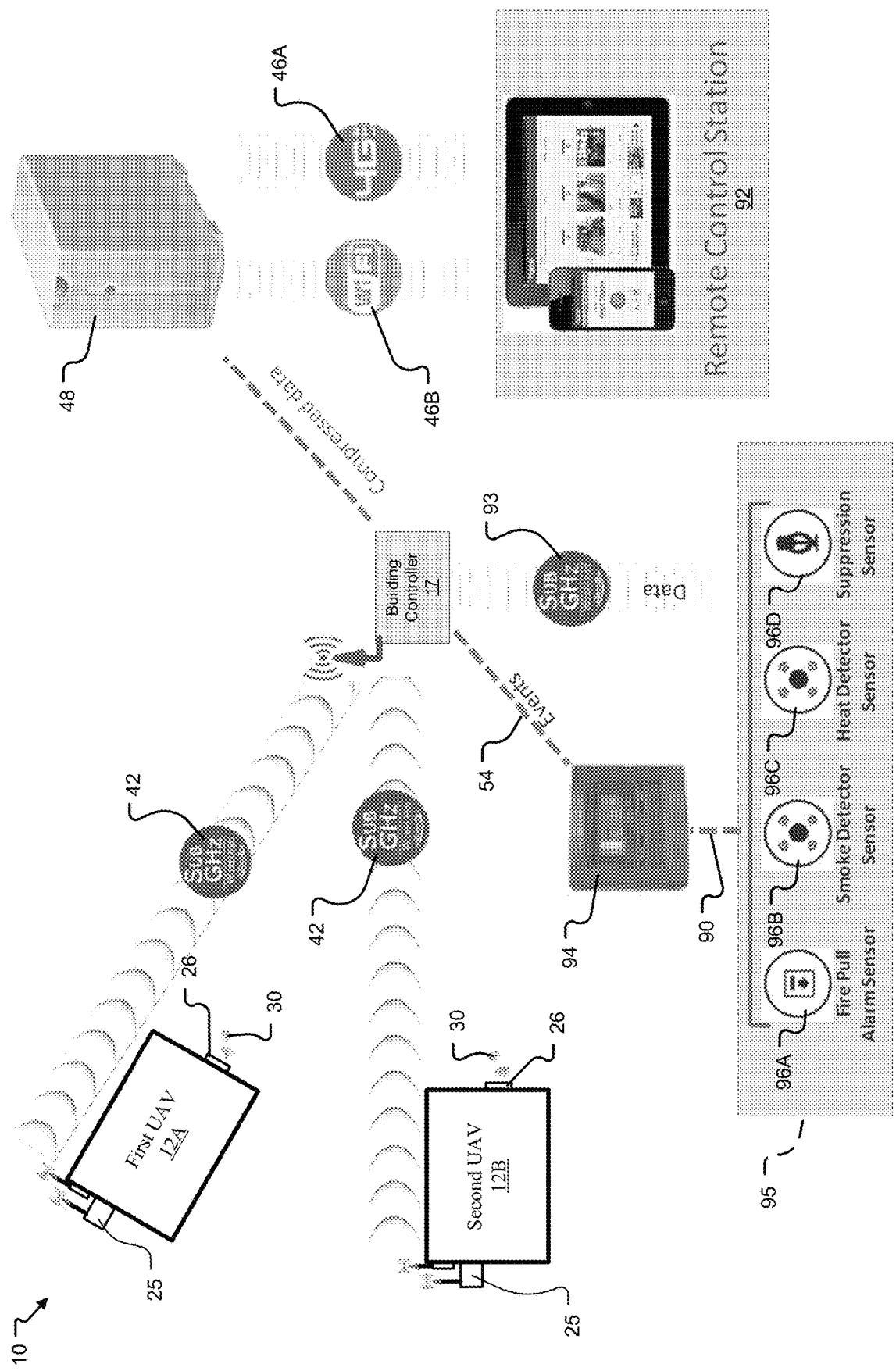
FIG. 1B is a schematic diagram showing further aspects of the search and rescue system.

FIG. 1B depicts the search and rescue system 10 showing further aspects of the present invention. As described above, the UAVs 12 communicate with building controllers 17 via UAV-command data links 42 (i.e., using UAV data link transceivers 25).

In the illustrated embodiment, the search and rescue system 10 include a remote control station 92. The remote control station 92 is configured to monitor and control the UAVs 12 remotely. For example, the remote control station 92 runs interactive mobile applications and services on a display that monitors and controls the UAVs 12. The interactive mobile applications and services provide real-time or near real-time UAV status data, UAV location, survivor location, etc. Also, the interactive mobile applications and services can provide command options for controlling the UAVs 12. The remote control station 92 can include a single display such as a touch-screen display or non-touch screen display for displaying information.

The remote control station 92 monitors and controls the UAVs 12 (first UAV 12A and second UAV 12B) via the system manager 48 and building controller 17. In particular, the remote control station 92 communicates with the system manager 48 via a wide area data link 46 (e.g., 4G LTE 46A or Wi-Fi 46B). Then, the system manager 48 converts this communication to compressed data and sends the compressed communication to the building controller 17 via wire or wirelessly. The building controller 17 relays the compressed communication to the UAVs 12 (e.g., first UAV 12A or second UAV 12B). Also, the building controller 17 relays information from the UAVs 12 to the system manager 48. The system manager 48 forwards this UAV communication to the remote control station 92 via 4G LTE 46A or Wi-Fi 46B links, in some implementations.

As illustrated, the same building controller 17 receives building alarm information from fire alarm sensors 95. Fire alarm sensors 95 include fire pull alarm sensor 96A, smoke detector sensor 96B, heat detector sensor 96C, and/or suppression sensor 96D. The building controller 17 can receive the building alarm information directly from the fire alarm sensors 95 via a sensor-command data link 93. The sensor-command data link 93 can be same type of link as the UAV-command data link (e.g., sub-gigahertz data link). Alternatively, the building controller 17 can receive the building alarm information from a fire alarm panel 94. The fire alarm sensors 95 communicate building alarm information to the fire alarm panel 94 via a sensor network 90. Then, the fire alarm panel 94 forwards the building alarm information as "events" to the building controllers 17 via wire or wirelessly.

Figure 2:
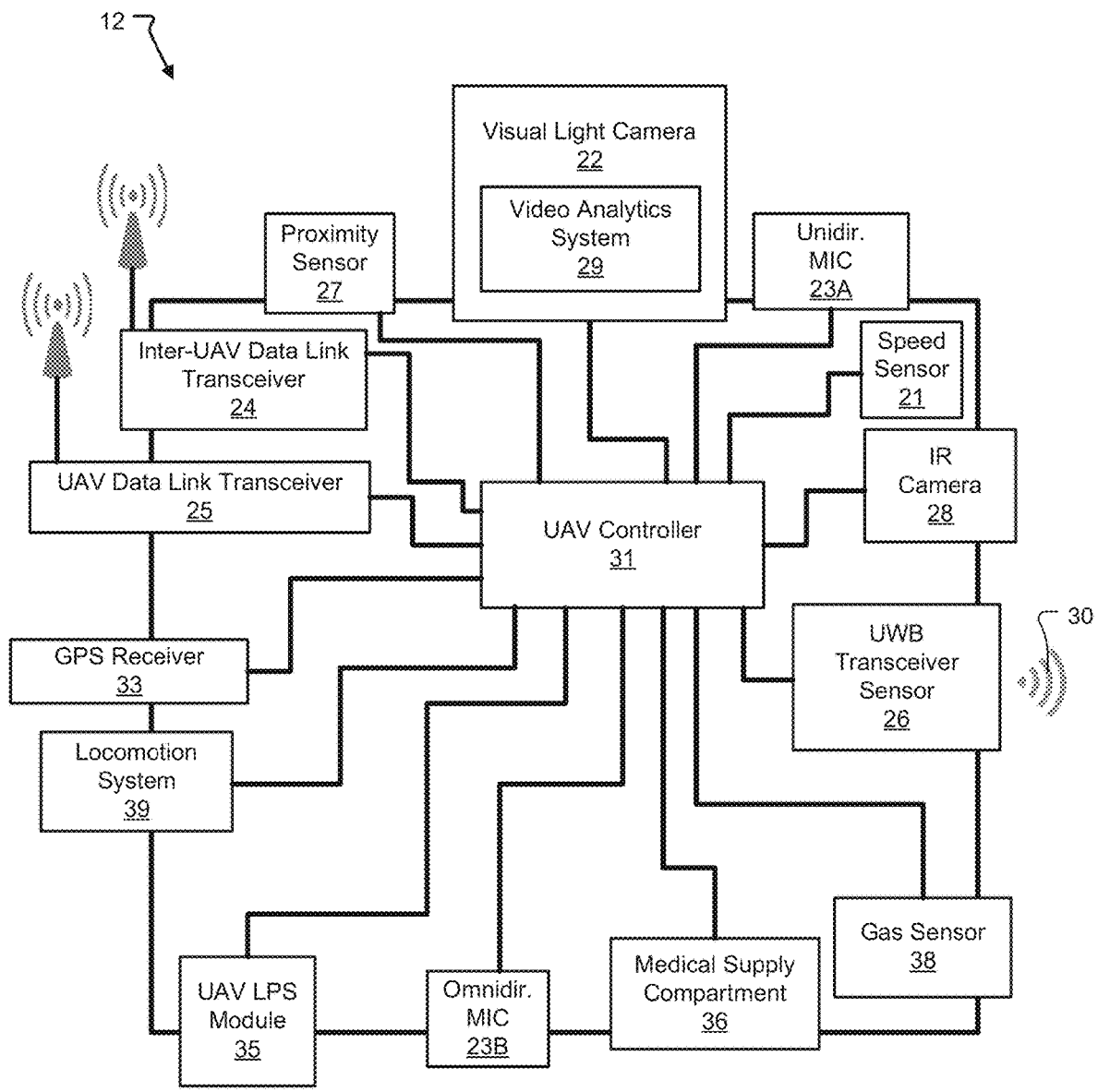
FIG. 2 is a block diagram illustrating the components of a UAV according to the present invention.

FIG. 2 shows a detailed view of various components in the UAV 12.

The UAV 12 includes a UAV controller 31. The UAV controller 31 monitors and controls UAV components which include various sensing mechanisms. For example, the UAV controller 31 directs sensing mechanisms that are used to detect survivors 40, determine location information, navigate through the search and rescue area 14, identify hazardous conditions in the search and rescue area 14, etc.

The UAV 12 includes a locomotion system 39 for moving the UAV. Typically, the locomotion system 39 includes at least one motor that powers jets, ducted systems, propellers or multiple rotor arms (e.g., multicopter UAVs such as bicopters, tricopters, quadcopters, pentacopters, hexacopters, octocopters, Y4s, Y6s, Vtails, or Xes). For this type of UAV 12, the locomotion system 39 controls movement by varying speed, pitch, and/or orientation of each propeller causing variation in thrust and direction of flight. In another example, the locomotion system 39 includes fixed wings that provide lift similarly to an airplane (e.g., tail-sitter UAV). In another example, the locomotion system 39 includes a propeller in a pusher configuration (e.g., fixed wing aircraft). Other types of locomotion systems 39 can be used with the UAV 12 as appreciated by one of skill in the art. In fact, the vehicle need not be aerial. Walking or other ground vehicles could also be used.

The UAV 12 includes a speed sensor 21 used in navigating the UAV 12. In particular, the speed, altitude and direction sensor 21 continuously measures the speed, orientation and direction of the UAV 12. These measurements can be fed into the UAV controller 31. The UAV controller 31 can instruct the locomotion system 39 to increase or decrease thrust to achieve a desired speed for the UAV 12 compared to the measured speed. The speed sensor 21 can use hall-effect sensors, voltage or current feedback of motors, or other speed measurement systems.

The UAV 12 includes a proximity sensor 27 for detecting a presence of objects in the search and rescue area 14. The UAV controller 31 uses this information to navigate the UAV 12 through the search and rescue area 14 by avoiding obstacles such as trees, boulders, etc. The UAV controller 31 directs the UAV data link transceiver 25 to wirelessly communicate information from the proximity sensor 27 (e.g., detected presence of objects) to the mobile command center 16.

The UAV 12 can include a unidirectional microphone 23A and an omni-directional microphone 23B for capturing audio data in the search and rescue area 14. The unidirectional microphone 23A (e.g., cardioid microphone or hyper-cardioid microphone) captures audio predominantly from one direction. The omni-directional microphone 23B captures audio evenly from all directions. In another example, the UAV 12 includes a bidirectional microphone which captures audio from two opposite directions. The UAV controller 31 directs the UAV data link transceiver 25 to wirelessly communicate this audio data to the mobile command center 16.

The UAV 12A, 12B can also include a visible light camera 22 for capturing video of the search and rescue area 14. The visual light camera 22 forms an image (i.e., generates digital stills and video) by using visible light. The visual light camera 22 typically operates in a 450 to 750 nanometer range. For example, the visual light camera 22 is a charge-coupled device (CCD) or complementary metal-oxide-semi-conductor (CMOS) camera. The visual light camera 22 has a variety of applications such as enabling the UAV 12 to avoid obstacles, localization techniques, improved accuracy of navigation, and video feedback. The visual light camera 22 has a video analytics system 29. The video analytics system 29 can be used for image recognition and processing. This video analytics system 29 can be used to confirm the detection of survivors 40 by recognizing the survivors 40. The UAV 12 communicates video from the visible light camera 22 to the mobile command center 16 via the UAV data link transceiver 25.

The UAV 12 includes an infrared (IR) camera 28 for supplementing detection of survivors 40 and navigation through search and rescue area 14. The IR camera 28 forms an image using infrared radiation. The IR camera 28 typically operates to detect light having wavelengths from 1 to several micrometers, to as long as 14,000 nanometers, or longer. In one example, the IR camera 28 is a thermal imaging camera used to detect heat signatures of survivors 40 and hotspots of fires. In another example, the IR camera 28 provides night vision capabilities which help in navigating the UAV 12. The IR camera includes either a cooled infrared detector or uncooled infrared detector.

The UAV 12 includes a gas sensor 38 for detecting a presence of different kinds of gases. For example, the gas sensor 38 can be used to supplement detection of survivors 40. In particular, the gas sensor 38 can detect carbon dioxide levels which can be used to confirm detection of survivors 40. The UAV data link transceiver 25 wirelessly communicates the detected presence of different gases to the mobile command center 16.

The UAV 12 includes a medical supply compartment 36 for holding emergency medical supplies. The medical supply compartment 36 is configured to release medical supplies to survivors 40 based on the detected presence of the survivor. For example, the medical supply compartment 36 can provide water, antibiotics, and/or drugs to survivors 40 as instructed by the mobile command center 16. For example, a user can input this instruction at the mobile command center 16 based on data received from the UAVs 12.

The UAV 12 can also include a GPS receiver 33. This GPS receiver 33 functions the same as the GPS receiver 33 described above for the mobile command center 16. In this example, the GPS receiver 33 calculates the UAV location (e.g., GPS coordinates) by receiving GPS information from GPS satellites. The GPS receiver 33 supplements the UAV LPS module in determining the UAV location.

Figure 4:
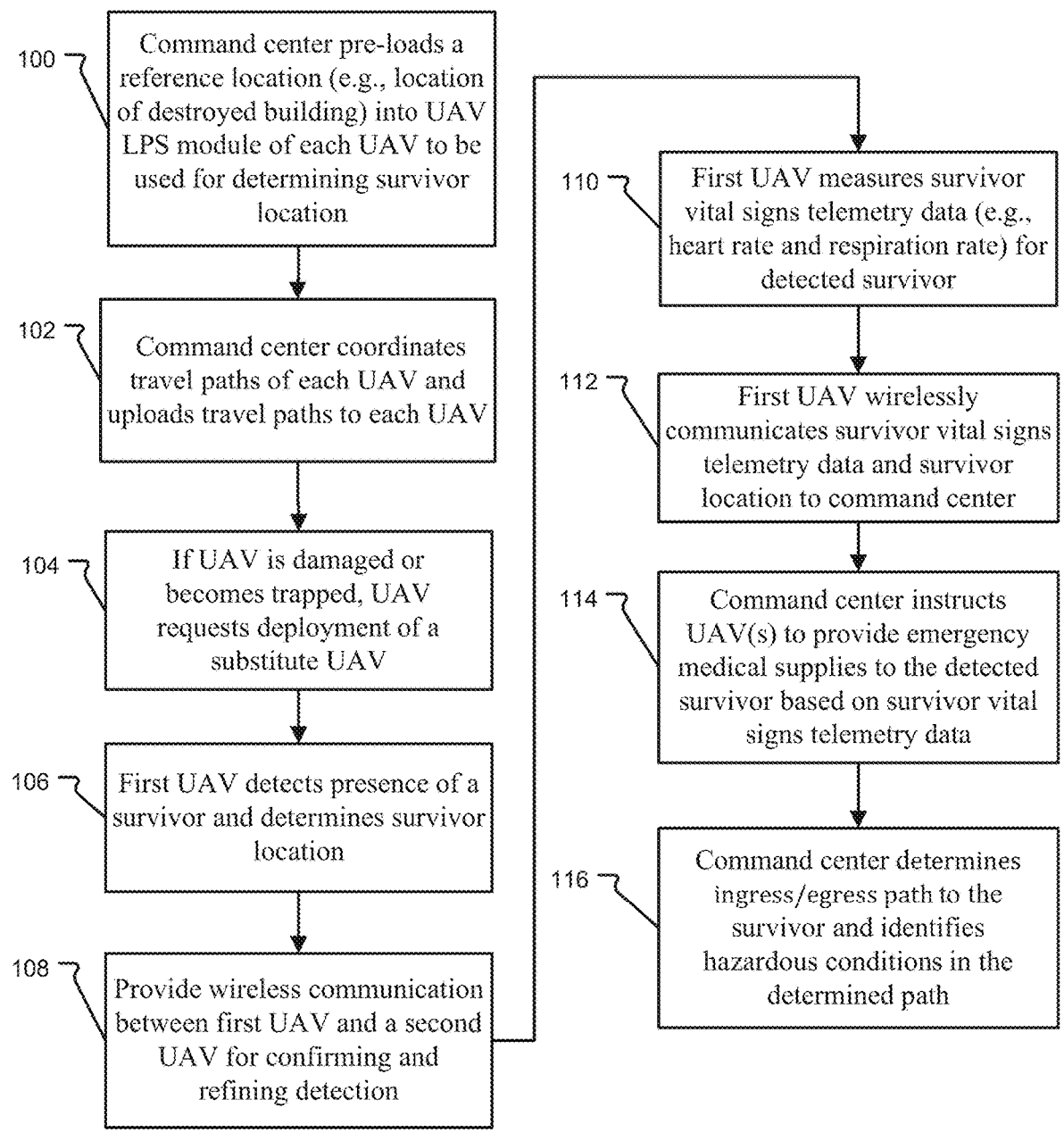
FIG. 4 is a flow chart illustrating the operation of the system.

FIG. 4 illustrates types of information exchanged between the mobile command center 16 and the first UAV 12A, the first UAV 12A and the second UAV 12B, as well as the mobile command center 16 and a first responder 82 during operation of the system 10. FIG. 5 illustrates a flow chart of the main steps included in the operation of the system 10.

Figure 3:
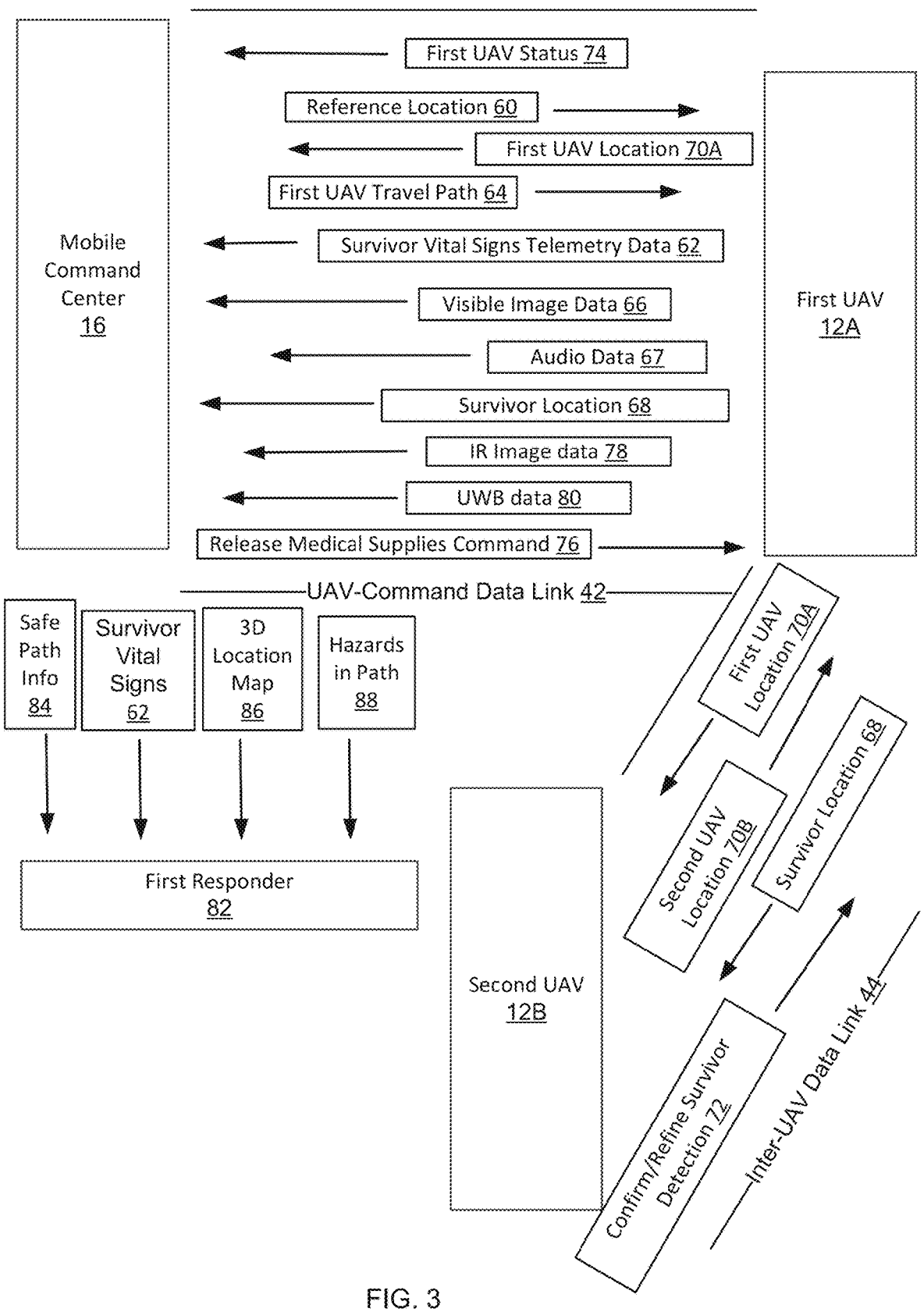
FIG. 3 is a schematic diagram illustrating the types of information exchanged between the command center and the first UAV as well as communications between the first UAV and the second UAV.

Prior to step 100, UAVs 12 having the UWB transceiver sensors 26, as described above, are deployed. In step 100, the mobile command center 16 pre-loads a reference location 60 (e.g., location of destroyed building) into the first UAV 12A to be used in determining survivor location 68. For example, as illustrated in FIG. 3, the mobile command center 16 sends the reference location 60 to the first UAV 12A. The UAV LPS module 35 (FIGS. 1A, 1B) of the first UAV 12A can use this reference location 60 as a datum to calculate the first UAV location 70A as geo-spatial coordinates for the first UAV 12A. Further, as described above, the first UAV 12A can accurately determine the survivor location 68 based on this calculated first UAV location and the measured distance between the first UAV 12A and the survivor 40 (FIG. 1A).

In step 102, the mobile command center 16 coordinates travel paths for each UAV 12A, 12B and uploads the coordinated travel paths to respective UAV 12A, 12B. For example, as illustrated in FIG. 3, the first UAV travel path 64 is uploaded to the first UAV 12A. The travel paths are coordinated so that the second UAV 12B does not overlap and replicate areas searched by the first UAV 12A. This coordination also optimizes the search operation.

During the search and rescue operation, the UAV 12 can continuously send status information to the mobile command center 16. For example, the first UAV 12A sends a first UAV status 74 that can include various UAV performance and device information. If the first UAV 12A is damaged (i.e., broken down) or trapped, the first UAV 12A can request deployment of a substitute second UAV 12B (step 104). This substitute deployment request may be sent within the first UAV status 74 message. Alternatively, this deployment request may be sent as a separate message from the UAV status 74.

In step 106, the first UAV 12A detects a presence of a survivor and determines the survivor location 68. As described above, the survivor location 68 is based on the calculated first UAV location 70A and the measured distance between the first UAV 12A and the survivor 40. As shown in FIG. 3, the first UAV 12A can wirelessly transmit the determined survivor location 68 to the mobile command center 16.

In step 108, wireless communication is provided between the first UAV 12A and second UAV 12B for confirming and refining detection. In particular, these wireless intercommunications between UAVs 12 refine the accuracy of detection by confirming or refining whether survivors 40 were correctly detected. As illustrated in FIG. 3, the first UAV 12A communicates the first UAV location 70A and survivor location 68 information to the second UAV 12B via the inter-UAV data link 44. The second UAV 12B communicates the second UAV location 70B to the first UAV 12A. For example, based on this information the second UAV 12B can locate the first UAV 12A and/or the survivor location and determine whether detection of the survivor 40 is correct. The second UAV 12B sends a confirm/refine survivor detection message 72 to the first UAV 12A based on the second UAV's determination of survivor detection.

In step 110, the first UAV 12A measures survivor vital signs telemetry data 62 (e.g., heart rate and respiration rate) for the detected survivor 40. As shown in FIGS. 2-3, the first UAV 12A wirelessly communicates the survivor vital signs telemetry data 62 and survivor location 68 to the mobile command center 16 (step 112). The mobile command center 16 uses the survivor vital signs telemetry data 62 to indicate the overall health condition of the identified survivor 40. In step 114, the mobile command center 16 instructs UAV(s) 12 to provide emergency medical supplies to the detected survivor 40 based on the survivor vital signs telemetry data 62. In particular, the mobile command center 16 sends a release medical supplies command 76 to the first UAV 12A instructing the first UAV 12A to release relevant medical supplies for the survivor 40. The medical supplies provide a temporary medical solution for the survivor 40 until first responders 82 can reach the survivor 40.

In step 116, the mobile command center 16 determines an ingress/egress path (i.e., safe path info 84) to the survivor 40 and identifies hazardous conditions in the determined path (i.e., hazards in path 88). Specifically, the mobile command center 16 can use information received from the UAVs 12 to locate and identify hazardous conditions in the determined path to the survivor. The mobile command center 16 can assess the path to the survivor 40 and provide an alternate path if the originally determined path is not usable.

The mobile command center 16 forewarns first responders 82 of the search and rescue area landscape and survivor health conditions via a display of the configurator computer workstation 18. For example, as illustrated in FIG. 3, the first responder 82 can view survival vital signs telemetry data 62, a 3d location map 86, safe path info 84, and hazards in path 88. The first responder 82 can use this information in making informed decisions, assessing the response priority within the search and rescue area 14, and providing timely medical attention to the affected survivor 40.

The UAVs 12 provide other information to the mobile command center 16 that aid first responders 82 in making informed rescue response decisions. As illustrated in FIG. 3, visible image data 66, audio data 67, IR image data 78, and UWB data 80 are sent from the first UAV 12A to the mobile command center 16. This information can be viewed by first responders 82 at the mobile command center 16. Such information allows first responders 82 to appropriately prioritize rescue response and other search and rescue decisions.

While this invention has been particularly shown and described with references to preferred embodiments thereof, it will be understood by those skilled in the art that various changes in form and details may be made therein without departing from the scope of the invention encompassed by the appended claims.

What is claimed is:
1. A search and rescue system, comprising:
   a command center comprising:
      a 3-dimensional (3D) mapping system to generate 3D contour maps of a search and rescue area; and
      a wide area modem for wireless communication with an alarm system of a campus, the command center configured to receive alarm information for a first building in the campus from the alarm system; and a first unmanned aerial vehicle (UAV) comprising:

one or more sensors including an ultra-wide-band (UWB) transceiver sensor with a phased array radar system to detect a presence of a survivor in the search and rescue area;

a UAV data link transceiver to wirelessly communicate information concerning the survivor from the one or more sensors to the command center;

an inter-UAV data link transceiver to wireless communicate information with a second UAV, wherein the first UAV is configured to transmit a request to deploy the second UAV responsive to detecting that the first UAV is damaged or trapped;

a global positioning signal (GPS) receiver to receive a global positioning signal to determine a position of the UAV, the GPS receiver supplementing a UAV local positioning system module in determining the position of the first UAV; and the UAV local positioning system module configured to:

receive one or more local positioning signals from a plurality of local positioning system portable antennas surrounding the search and rescue area;

determine a time delay of each of the one or more local positioning signals received by the UAV local positioning system module, each time delay relative to a particular local positioning system portable antenna and calculated based on a time difference between transmission of a local positioning signal by the particular local positioning system portable antenna and receipt of the local positioning signal by the UAV local positioning system module;

determine a distance from the first UAV to each of a subset of the plurality of local positioning system portable antennas based on the time delay of each local positioning signal;

determine a localized position of the first UAV in the search and rescue area based on the distance from the UAV to each of the subset of the plurality of local positioning system portable antennas; and send the localized position of the first UAV to the command center via the UAV data link transceiver;

wherein, in response to receiving the localized position of the first UAV, the 3D mapping system generates a 3D contour map of a region relative to the localized position, the 3D contour map indicating at least one of an ingress or an egress path from the mobile command center to a detected survivor;

wherein the first UAV is configured to transmit information regarding the survivor to the second UAV to refine the accuracy of the detected presence of the survivor by confirming that the survivor was correctly detected.

2. The system of claim 1, wherein the command center comprises a local positioning system command center module for receiving global and/or local positioning signals from the plurality of local positioning system portable antennas surrounding the search and rescue area for determining the position of the first UAV in the search and rescue area.

3. The system of claim 1, wherein the UAV data link transceiver is configured to wirelessly communicate the information concerning the survivor via a UAV-command data link to the command center.

4. The system of claim 1, wherein the information concerning the survivor includes survivor vital signs telemetry data.

5. The system of claim 4, wherein the survivor vital signs telemetry data comprises a heart rate and/or a respiration rate of the survivor.

6. The system of claim 1, wherein the first UAV further comprises a medical supply compartment for holding emergency medical supplies, wherein the medical supply compartment is configured to release medical supplies to the survivor based on the detected presence of the survivor.

7. The system of claim 1, wherein the first UAV further comprises a proximity sensor for detecting a presence of objects in the search and rescue area, wherein the UAV data link transceiver wirelessly communicates the detected presence of objects to the command center.

8. The system of claim 1, wherein the first UAV further comprises a gas sensor for detecting a presence of different kinds of gases, wherein the UAV data link transceiver wirelessly communicates the detected presence of different gases to the command center.

9. The system of claim 1, wherein the first UAV further comprises a visible light camera for detecting video and communicating the video to the command center.

\* \* \* \* \*